(12) United States Patent
van Diggelen

(10) Patent No.: US 7,739,032 B2
(45) Date of Patent: Jun. 15, 2010

(54) METHOD AND APPARATUS FOR GENERATING AND USING A REGIONAL-TERRAIN MODEL

(75) Inventor: Frank van Diggelen, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 671 days.

(21) Appl. No.: 11/277,088

(22) Filed: Mar. 21, 2006

(65) Prior Publication Data
US 2009/0066576 A1 Mar. 12, 2009

(51) Int. Cl.
*G01S 5/14* (2006.01)
(52) U.S. Cl. .............. 701/207; 342/357.13; 342/357.09; 340/988; 340/426.16; 340/426.19
(58) Field of Classification Search .................. 701/207, 701/200; 342/357.13, 357.09; 340/988, 340/991, 426.16, 426.19; 707/101
See application file for complete search history.

(56) References Cited

U.S. PATENT DOCUMENTS

| | | | |
|---|---|---|---|
| 4,949,268 A | 8/1990 | Nishikawa et al. | |
| 4,954,837 A | 9/1990 | Baird et al. | |
| 5,087,919 A | 2/1992 | Odagawa et al. | |
| 5,596,500 A | 1/1997 | Sprague et al. | |
| 5,995,903 A | 11/1999 | Smith et al. | |
| 6,047,227 A | 4/2000 | Henderson et al. | |
| 6,061,018 A | 5/2000 | Sheynblat | |
| 6,094,607 A | 7/2000 | Diesel | |
| 6,157,891 A | 12/2000 | Lin | |
| 6,252,543 B1 | 6/2001 | Camp | |
| 6,259,403 B1 | 7/2001 | Nichols | |
| 6,429,814 B1 * | 8/2002 | van Diggelen et al. | 342/357.13 |
| 6,590,530 B2 | 7/2003 | van Diggelen et al. | |
| 7,196,660 B2 * | 3/2007 | Abraham et al. | 342/357.15 |
| 7,307,583 B1 * | 12/2007 | Woodell et al. | 342/173 |
| 7,373,612 B2 * | 5/2008 | Risch et al. | 715/850 |
| 2002/0050944 A1 * | 5/2002 | Sheynblat et al. | 342/357.06 |
| 2002/0069019 A1 * | 6/2002 | Lin | 701/301 |
| 2003/0023379 A1 * | 1/2003 | Diggelen et al. | 701/215 |
| 2004/0257277 A1 * | 12/2004 | Abraham et al. | 342/357.09 |
| 2005/0182530 A1 * | 8/2005 | Murphy | 701/16 |
| 2006/0116131 A1 * | 6/2006 | Morgan et al. | 455/456.1 |
| 2006/0229805 A1 * | 10/2006 | Diggelen | 701/207 |
| 2007/0171124 A1 * | 7/2007 | Weill | 342/357.06 |
| 2007/0252758 A1 * | 11/2007 | Loomis | 342/357.15 |

OTHER PUBLICATIONS

M. Cameron, A. Brown, "Intelligent Transportation System Mayday Becomes a Reality", IEEE, 1985, pp. 340-347.
International Search Report dated May 14, 2003 for PCT application No. PCT/US01/47162.
European Search Report dated Sep. 22, 2004 for European Patent Application No. EP 01 99 0915.

* cited by examiner

*Primary Examiner*—Tuan C To
(74) *Attorney, Agent, or Firm*—McAndrews Held & Malloy, Ltd.

(57) ABSTRACT

A method and apparatus for computing position using a regional-terrain model is provided. The method includes obtaining from at least three satellites pseudorange measurements, computing a transitional position by using a default altitude with a large uncertainty, using this transitional position to obtain from a terrain model altitude information associated with a region, and computing an accurate three-dimensional position as a function of the pseudorange measurements and the altitude information. The region defines a boundary, and the boundary includes the transitional position.

14 Claims, 6 Drawing Sheets

METHOD AND APPARATUS FOR GENERATING AND USING A REGIONAL-TERRAIN MODEL

BACKGROUND OF THE INVENTION

1. Field of the Invention

The invention relates to Global Navigation Satellite System (GNSS) receivers. More particularly, the invention relates to a method and apparatus for enhancing a GNSS receiver's position computation capability using terrain model information.

2. Description of the Related Art

In general, a positioning receiver for a Global Navigation Satellite System ("GNSS"), such as the Global Positioning System ("GPS"), GLONASS, and GALILEO, uses measurements from several satellites to compute or determine the receiver's position. The GNSS receiver may determine the initial position (or "first fix") by processing signals transmitted from at least three, but usually, four satellites (collectively "satellite signals"). With these satellite signals, the positioning receiver may solve for the position using four unknowns. These four unknowns typically include the information corresponding to three dimensions (e.g., a latitude, longitude, and altitude) and a common-mode-timing error.

As is well known, however, having a-priori estimates for any of these four unknowns is advantageous because such information typically reduces time, processing power, and battery usage (if battery powered) for acquiring the satellite signals and for determining the position using such satellite signals. Of the three dimensions that may be supplied with a-priori estimates, common commercial implementations of the positioning receiver typically provide an initial a-priori estimate of altitude. This initial a-priori estimate of altitude may fix the altitude at zero or some other altitude ("fixed altitude"). Using the fixed altitude to determine the position, however, may result in the position being substantially incorrect.

In other prior implementations, the GNSS receiver was provided with and used large-scale, comprehensive, point-based or grid-based terrain models to obtain the a-priori estimates of altitude. However, these and the other prior implementations may require large amounts of memory and significant processing power to store, retrieve, and process the large-scale, comprehensive, point-based or grid-based terrain models, or more specifically, the information defined within the large-scale, comprehensive, point-based or grid-based terrain models.

Therefore, a need exists in the art for a method and apparatus for enhancing a GNSS receiver such that the position may be rapidly determined by using an accurate estimate of altitude.

BRIEF DESCRIPTION OF THE DRAWINGS

So that the manner in which the above recited features are attained and can be understood in detail, a more detailed description, which is briefly summarized above, is described below with reference to the Figures illustrated in the appended drawings.

It is to be noted that the Figures in the appended drawings, like the detailed description, are examples. And as such, the Figures and the detailed description are not to be considered limiting, and other equally effective examples are possible and likely. Furthermore, like reference numerals in the Figures indicate like elements: wherein.

DETAILED DESCRIPTION OF THE INVENTION

Figure 1:
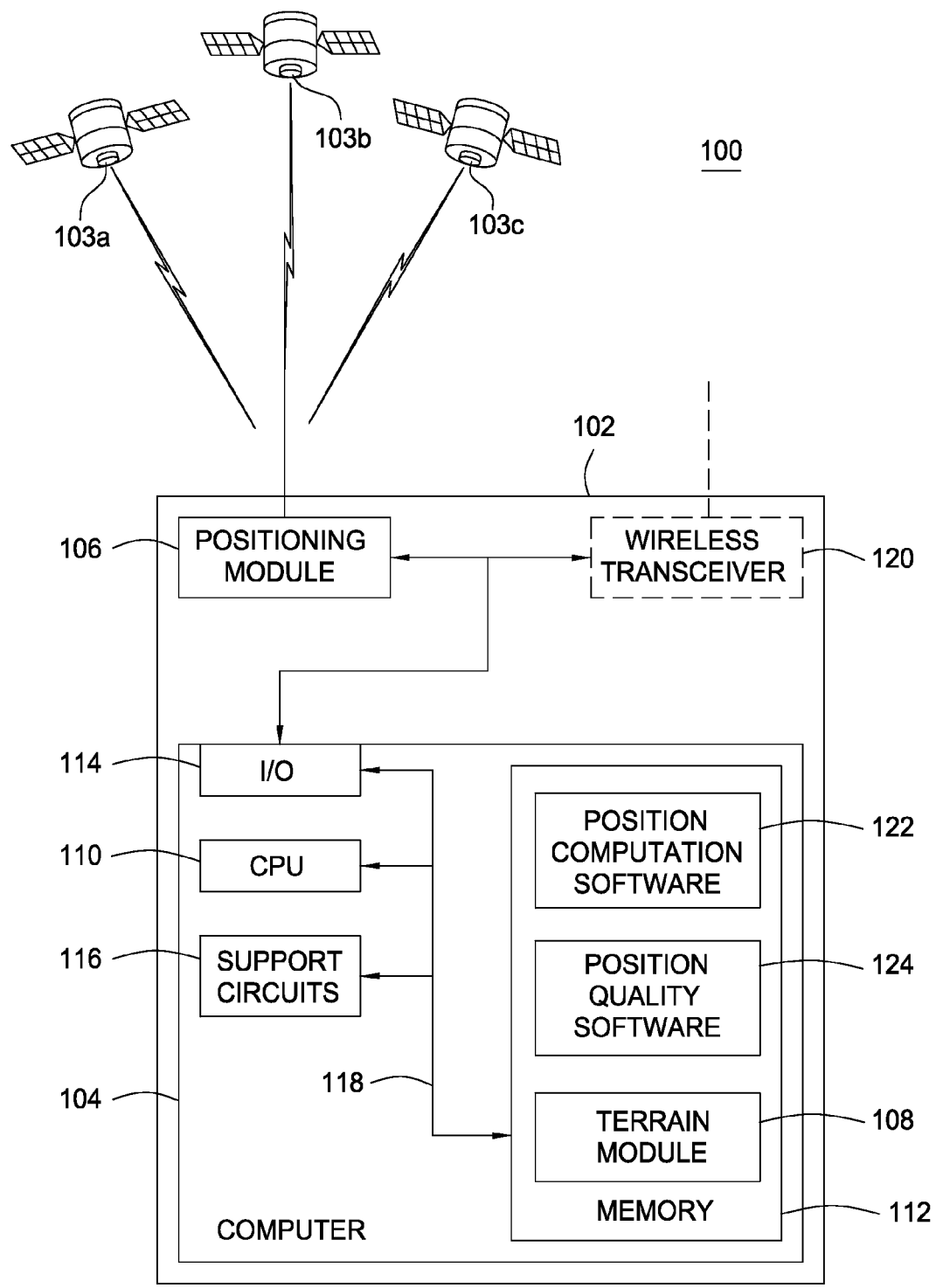
FIG. 1 is a first block diagram illustrating an example of a Global Navigation Satellite System.

FIG. 1 is a block diagram illustrating an example of a Global Navigation Satellite System ("GNSS") 100. The GNSS 100 includes a plurality of satellites for transmitting satellite signals, as represented by first, second and third satellites 103a, 103b, and 103c, and a GNSS receiver 102 for receiving the satellite signals. The first, second and third satellites 103a-103c, the GNSS receiver 102, the GNSS 100 as a whole, and functions, procedures, components and other details provided herein may be tailored for any GNSS, including, for example, the Global Positioning System ("GPS"), GALILEO, GLONASS, SBAS (Space Based Augmentation System), QZSS (Quazi-Zenith Satellite System), LAAS (Local Area Augmentation System) or some combination thereof.

In the GNSS 100, a position of the GNSS receiver 102 may be determined, computed or otherwise formed as a function of the satellite signals received from the satellite 103a-103c and a regional-terrain model. This regional-terrain model, as described in more detail below, includes an accurate estimate of altitude for one or more regions of the earth ("modeled regions"). Each of these modeled regions delineates a collection of terrain; all or portions of which have an altitude that falls within a range of altitudes (e.g., a range of altitudes defined by a given altitude and a given altitude uncertainty).

To facilitate determining the position, the GNSS receiver 102 may include or be coupled to and utilize a computer or computing device 104, a positioning module 106, and a terrain module 108. As part of determining the position and/or one or more transitional solutions for ultimately determining the position, the computer 104 may process (i) a plurality of pseudorange measurements that are output from the positioning module 106 in combination with (ii) the regional-terrain model, which is stored in the terrain module 108.

The positioning module 106 comprises circuitry to facilitate receiving and processing GNSS satellite signals in a well-known manner. Typically, the positioning module 106 comprises an RF front end coupled to a baseband processor. The positioning module 106 acquires the satellite signals and generates pseudorange measurements (i.e., clock errors plus distances between the GNSS receiver 102 and the satellites 103a-103c). Any form of a positioning module is useful in this role. Examples of the positioning module may be found in any of the GL20000, Hammerhead and Marlin available from Global Locate Inc. of San Jose, Calif., or the SiRFStarIII available from SiRF Technology Holdings Inc. of San Jose, Calif.

The computer 104 comprises a central processing unit ("CPU") 110, a memory 112, an input/output interface ("I/O") 114, support circuits 116, and at least one bus or serial communication link 118. The CPU 110 may be one or more well-known processors or microprocessors. The support circuits 116 comprise well known circuits that facilitate operation of the CPU 110. The support circuits 116 comprise at least one of cache, power supplies, clock circuits, and the like.

The memory 112 may be embodied as a random access memory ("RAM"), a read only memory ("ROM"), an erasable programmable read only memory ("EPROM") and variations thereof, content addressable memory ("CAM") and variations thereof, flash memory, disk drive storage, removable storage, or any combination thereof. The memory 112 may be loaded with and store the terrain module 108 and position computation software that uses the terrain model stored in the terrain module 108 to compute the position of the GNSS receiver 102.

The bus or serial communication link 118 provides for transmissions of digital information, including information relating to determining the position and/or relating to the regional-terrain model, among the CPU 110, support circuits 116, memory 112, I/O 114, and other portions of the GNSS receiver 102 (not shown).

The I/O interface 114 provides an interface to control the transmissions of digital information to and from the GNSS receiver 102. The I/O interface 114 may interface with one or more I/O devices, such as a keyboard, touch screen, and/or other device.

Optionally, the GNSS receiver 102 may be coupled to a communication receiver or transceiver 120 for communicating with a terrestrial communication network, such as a cellular or other wireless or wired communication network. Using the communication receiver or transceiver the GNSS receiver 102 may obtain from an external source, such as an assistance server, assistance information to assist in acquiring and processing the satellite signals. The combination of the GNSS receiver 102 and the receiver or transceiver 120 may be contained within a mobile station, such as a cellular or other wireless type device.

Examples of a combination of the GNSS receiver and the receiver or transceiver, and the assistance server are provided in commonly-assigned U.S. Pat. Nos. 6,411,892; 6,429,814; 6,587,789; 6,590,530; 6,703,972; 6,704,651; and 6,813,560; U.S. patent application Ser. No. 09/993,335, filed Nov. 6, 2001; Ser. No. 10/349,493, filed Jan. 22, 2003; Ser. No. 10/359,468, filed on Feb. 5, 2003; Ser. No. 10/692,292, filed Oct. 23, 2003; Ser. No. 10/719,890, filed Nov. 21, 2003; Ser. No. 10/926,792, filed Aug. 26, 2004; Ser. No. 10/884,424, filed on Jul. 1, 2004; Ser. No. 10/912,516, filed Aug. 5, 2004; Ser. No. 10/932,557, filed on Sep. 1, 2004; Ser. No. 10/968,345, filed on Oct. 19, 2004; Ser. No. 11/077,380, filed on Mar. 3, 2005; Ser. No. 11/206,615, filed on Aug. 18, 2005; Ser. No. 11/261,413, filed on Oct. 28, 2005; and U.S. Provisional Patent Application Ser. No. 60/760,140, filed on Jan. 19, 2006; all of which are incorporated herein by reference in their entirety.

The terrain module 108 may be embodied as a data store (e.g., a register, accumulator, buffer, database, etc.) in which some or the entire regional-terrain model is stored or is otherwise contained. Typically, a large portion or the entire regional-terrain model is stored locally within the terrain module 108 (i.e., in the memory 112 of the computer 104) when such portions of the regional-terrain model fit within the storage capacity of the memory 112. Alternatively, the entire regional-terrain model, or portions thereof, can be downloaded into terrain module 108 and/or updated via a communication link and the communication receiver or transceiver 120, as needed.

The amount of space in the memory 112 occupied by the regional-terrain model may be based on the amount and definition of the modeled regions in the regional-terrain model. In any case, the regional-terrain model occupies less of such space than the amount of space occupied by the aforementioned large-scale, comprehensive, point-based or grid-based terrain models for equivalent terrain coverage because each region in the regional-terrain model may cover several square kilometers.

Figure 2:
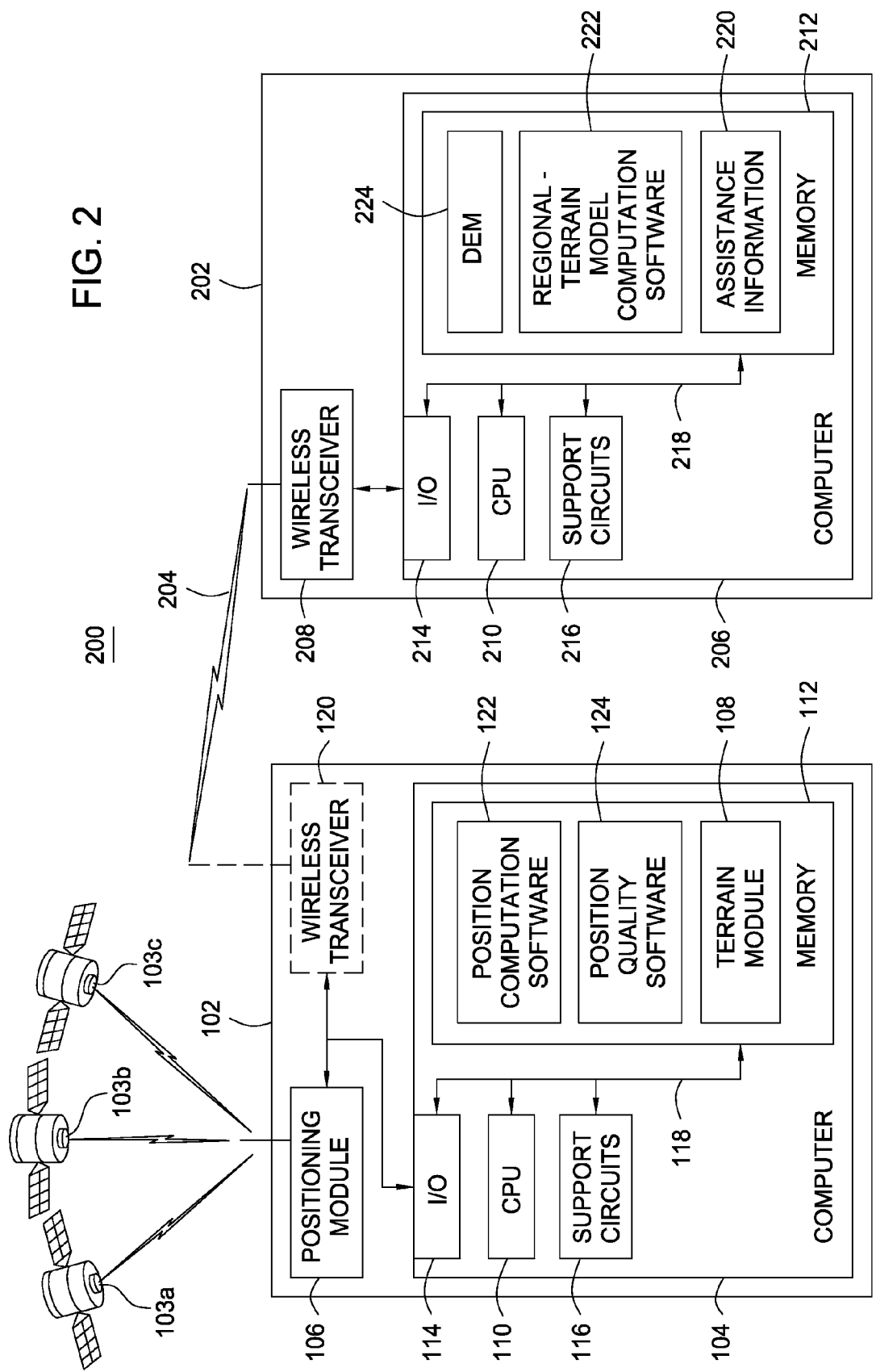
FIG. 2 is a second block diagram illustrating another example of a Global Navigation Satellite System.

FIG. 2 is a block diagram illustrating another example of a GNSS 200. The GNSS 200 is similar to the GNSS 100 of FIG. 1 except as described below. The GNSS 200 includes a server 202 for providing to the GNSS receiver 102, via a communication link 204, information, such as assistance information for assisting acquisition and processing of the satellite signals as noted above, and/or some or the entire regional-terrain model. As described in more detail with respect to FIG. 3, the server 202 may also be used to generate the regional-terrain model.

To facilitate providing the information to the GNSS receiver 102, the server 202 may include or be coupled to and utilize a computer or computing device 206, and a communication receiver or transceiver 208. The computer 206 comprises a CPU 210, a memory 212, an I/O 214, support circuits 216, and at least one bus 218. The CPU 110 may be one or more well-known processors or microprocessors. The support circuits 216 comprise well known circuits that facilitate operation of the CPU 210. The support circuits 216 may include at least one of cache, power supplies, clock circuits, and the like.

The memory 212 may be embodied as a random access memory ("RAM"), a read only memory ("ROM"), an erasable programmable read only memory ("EPROM") and variations thereof, content addressable memory ("CAM") and variations thereof, flash memory, disk drive storage, removable storage, or any combination thereof. The memory 212 may be loaded with and store the assistance information 220, executable instructions 222 (e.g., software, firmware, etc.) for generating the regional-terrain model, and one or more large-scale, comprehensive, point-based or grid-based terrain models or digital-elevation models ("DEM") 224, such as the GTOPO30 DEM. Details of other point-based or grid-based terrain models, which may be loaded into and stored in the memory 212 in addition to or in lieu of DEM 224, may be found in commonly-assigned, U.S. Pat. Nos. 6,429,814 and 6,590,530, filed on Mar. 19, 2001 and Mar. 7, 2002, respectively. Each of the U.S. Pat. Nos. 6,429,814 and 6,590,530 is incorporated herein by reference in its entirety.

The bus 218 provides for transmissions of digital information, including the assistance information 220, the regional-terrain model 222, the DEM 224, among the CPU 210, support circuits 216, memory 212, I/O interface 214, and other portions of the server 202 (not shown). The I/O interface 214 provides an interface to control the transmissions of the digital information to and from the server 202. The I/O interface 214 may interface with one or more I/O devices, such as a keyboard, touch screen, and/or other device.

The communication receiver or transceiver 208 may communicate the assistance information and/or the regional-terrain model using a terrestrial communication network. This terrestrial communication network may be, for example, a cellular or other wireless or wired communication network.

As noted above, the regional-terrain model includes the accurate estimates of altitude for each of the modeled regions contained therein. This altitude, in addition to enabling the GNSS receiver 102 to rapidly and accurately determine the position, may be very useful if only a few pseudorange measurements for determining the position are available to the GNSS receiver 102.

For example, the GNSS receiver 102 typically must solve for at least four independent variables (e.g., latitude, longitude, altitude and common-mode error) to determine the initial position (or first fix). If, however, the GNSS receiver 102 can obtain only three independent pseudorange measurements from a corresponding number of the satellites 103a-103c, then the altitude information from the regional-terrain model can be used to provide the fourth independent measurement.

The given altitude may be defined as an average altitude over its associated modeled region, a median altitude of its associated modeled region, or some other altitude that is valid within its modeled region. As an option, the given altitude may also be offset by a fixed amount to account for an expected height of the GNSS device 102 from the given altitude.

For example, the GNSS receiver 102 (as, for example, included in a mobile device) may be deployed in a movable vehicle and may have an antenna located at a given height above the surface of the earth. As such, the given altitude may be offset by an amount to account for the height of the antenna above the surface of the earth.

Figure 3:
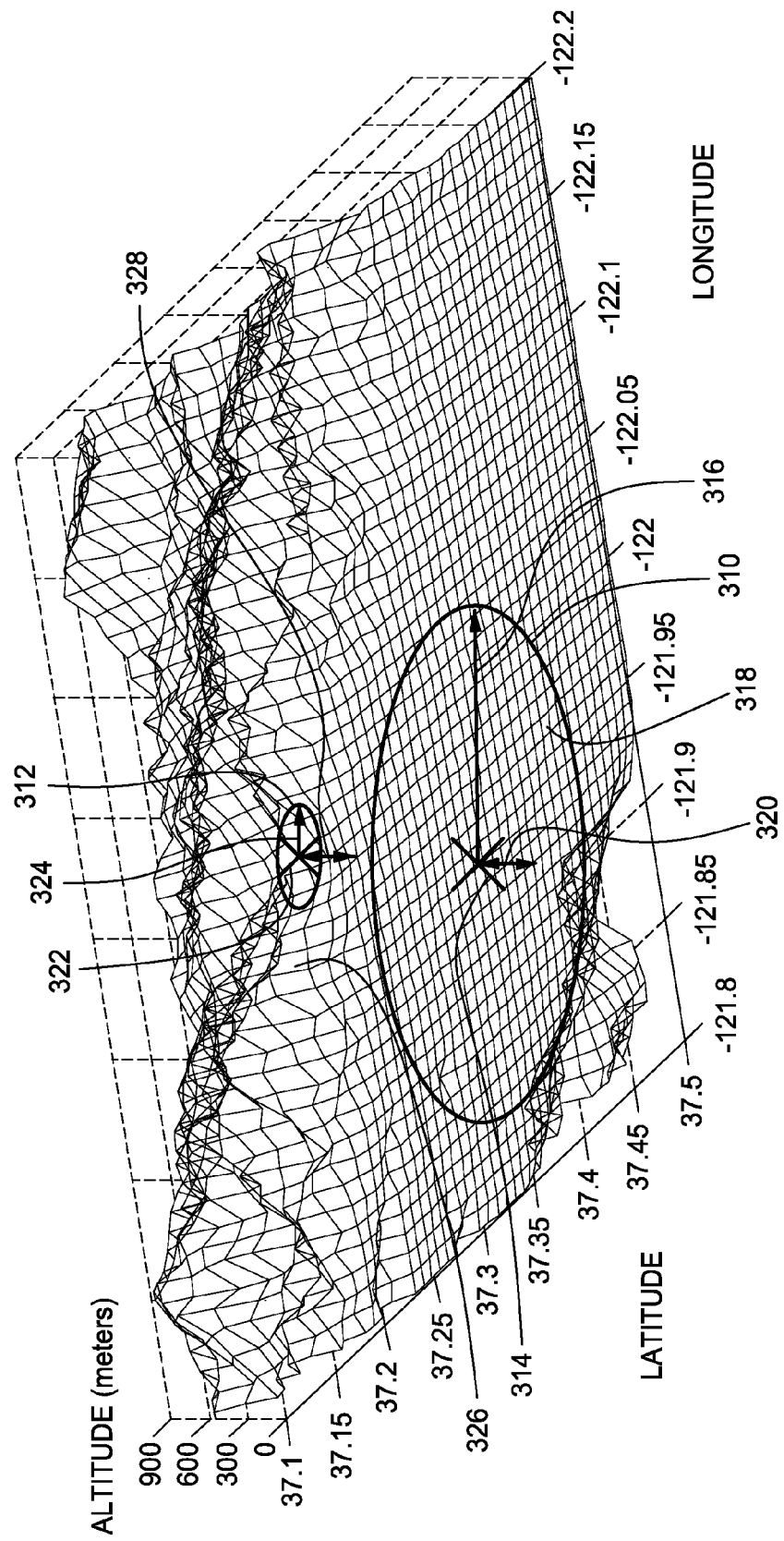
FIG. 3 is a first graph illustrating a three-dimensional terrain map onto which are superimposed first and second modeled regions for inclusion in a regional-terrain model.

FIG. 3 is a graph illustrating a three-dimensional terrain map 300 onto which are superimposed first and second modeled regions 310, 312 for inclusion in a regional-terrain model. The first modeled region 310 is located at a fairly flat topography, and the second modeled region 312 is located at a fairly mountainous topography.

Each of the modeled regions 310, 312 may be defined by a latitude, longitude, and a radius. In addition, the altitude for each of the modeled regions 310, 312 may be specified such that it is assumed constant throughout such modeled regions 310, 312.

The sizes of the modeled regions 310, 312 (e.g., as delineated, for example, by the length of the radius) are defined by respective altitude uncertainties that are associated with the altitude specified for such modeled regions 310, 312.

Specifically, the first modeled region 310, which is in a form of a circle, includes a first boundary defined by a first coordinate-system point 314 and a first radius 316. The altitude information for the first modeled region 310 may include a first altitude 318 and an associated first altitude uncertainty 320. In this example, the first altitude 318 is at zero meters. The first radius 216 is specified so as to include all or most of the coordinate-system points that have altitudes that fall within the range of altitude defined by the first altitude and associated first altitude uncertainty 320.

The second modeled region 312, which is also in a form of a circle, includes a second boundary defined by a second coordinate-system point 322 and a second radius 324. The altitude information for the second modeled region 312 may include a second altitude 326 and an associated second altitude uncertainty 328. In this example the second altitude 318 is at 300 meters. The second radius 324 is specified so as to include all or most of the coordinate-system points that have altitudes that fall within the range of altitudes defined by the second altitude and associated second altitude uncertainty 328. Assuming that the first and second altitude uncertainties 320, 328 are the same, the second radius 324 is smaller than the first radius 318.

Each of the modeled regions 310, 312 (e.g., the latitude, longitude, radius and associated altitude thereof) may be included in the regional-terrain model, and as such, be stored within the terrain module 108 of FIG. 1. Alternatively, one or the other of the modeled regions 310, 312 may be included in the regional-terrain model, and stored within the terrain module 108 of FIG. 1

Figure 4:
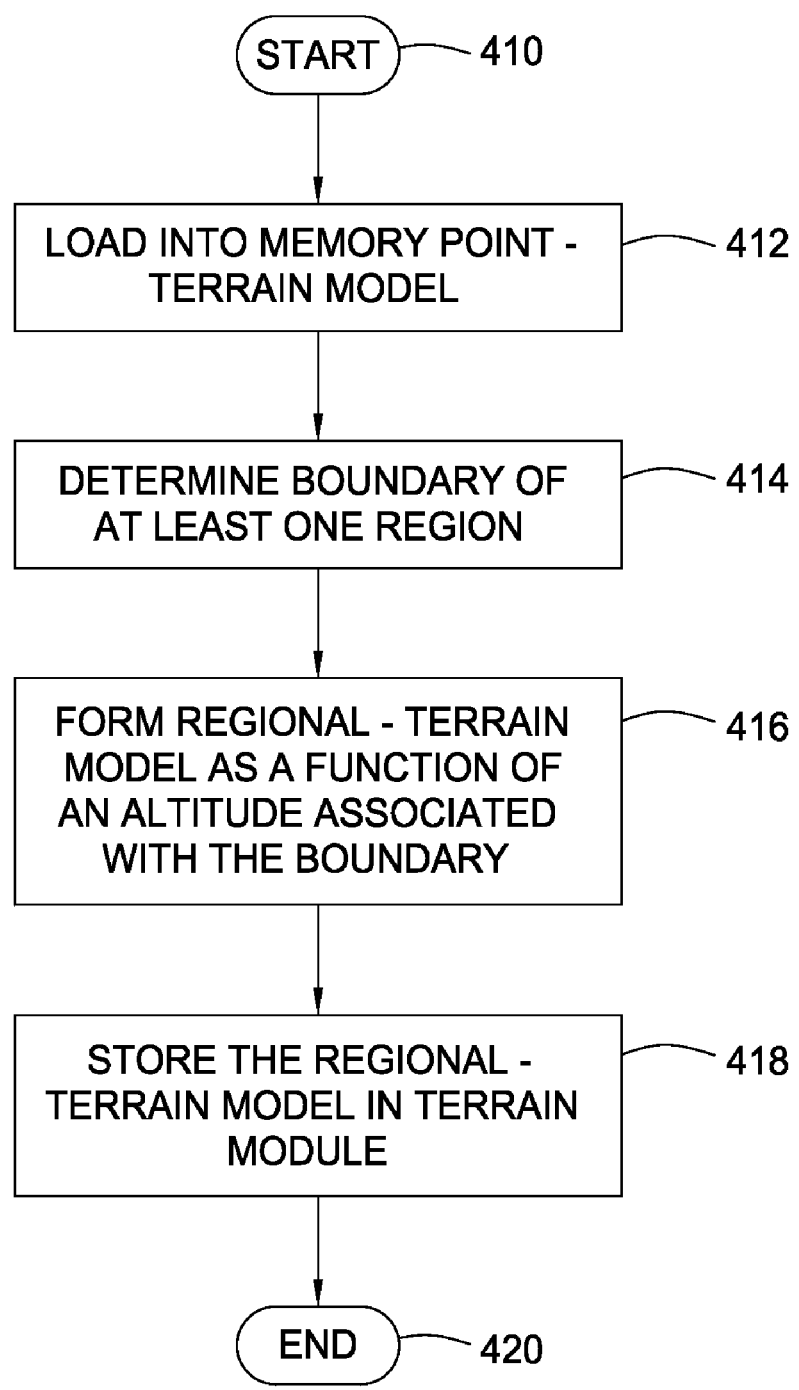
FIG. 4 is a first flow diagram illustrating an example process for creating a regional-terrain model.

FIG. 4 is a flow diagram illustrating an example process 400 for creating a regional-terrain model. The following describes the process 400 being performed by the server 202 or other processing device (not shown), such as a high-speed personal computer, a mainframe, a server-type computer, and the like.

The process 400 begins at termination block 410, and thereafter transitions to process block 412 at which the CPU 212 loads into the memory 212 some or all of the DEM 224. If the server 202 does not load all of the DEM 224 at process block 412, then the CPU 210 may load into the memory 212 other portions of the DEM 224, as or if necessary.

At process block 414, the CPU 210 determines a boundary for at least one modeled region. To determine the boundary, the CPU 210 using the regional-terrain-generation software 222 may locate within the DEM 224 a first altitude that corresponds to a first coordinate-system point (e.g., a given latitude and longitude), such as an altitude for any of Atlanta, Ga.; Cambridge, UK; and Cannes, FR; as shown in TABLE 1 below. Alternatively, the first altitude may be an altitude at coordinate-system point closely located to the first coordinate-system point.

The regional-terrain-generation software 222 may then select or use a predefined altitude uncertainty along with first altitude to define the range of altitudes. Alternatively, regional-terrain-generation software 222 may define the range of altitudes by setting the altitude uncertainty as a function of the first altitude (e.g., a positive and/or negative deviation about the first altitude) given its distance from the reference of the DEM 224.

At some time thereafter, the regional-terrain-generation software 222, using a search algorithm (as described in more detail below), locates within the DEM 224 a second altitude that corresponds to a second coordinate-system point. The second coordinate-system point may be next to, neighboring, adjacent to, distant from or otherwise spaced from the first coordinate-system point.

After locating the second altitude, the regional-terrain-generation software 222 determines whether the second altitude falls within the range of altitude, e.g., falls within the range altitudes formed from the first altitude and the altitude uncertainty. If the second altitude falls within the range of altitudes, then the search algorithm locates within the point-terrain model a third altitude that corresponds to a third coordinate-system point.

The third coordinate-system point may be next to, neighboring, adjacent to, distant from or otherwise spaced from the given and/or second coordinate-system points. If the third altitude falls within the range of altitudes, then the search algorithm performs iterations of locating within the DEM 224 additional altitudes that correspond to additional coordinate-system points and fall within the range of altitudes.

If, on the other hand, the search algorithm determines that the second, third or any of the additional altitudes does not fall within the range of altitudes, then the search algorithm marks, as a point outside or on the boundary ("boundary point"), such second, third and/or additional coordinate-system points. Depending on the shape of the boundary (e.g., a circle, polygon, ellipse, etc.), the search algorithm may continue to iterate locating within the point-terrain model additional altitudes that correspond to additional coordinate-system points that fall within the range of altitudes until the boundary is defined.

The search algorithm may be simple or complex, and may employ fuzzy logic, classical logic and/or other probabilistic methodologies. In addition, the search algorithm may select the spacing between the first, second, third and/or additional coordinate-system points as a function of its simplicity or complexity and the shape of the boundary. That is, the search algorithm may determine whether the second, third and/or additional coordinate-system points are next to, neighboring, adjacent to, distant from or otherwise spaced from the first, second, third and/or additional coordinate-system points.

For example, the search algorithm, in a simple form, may select the second, third and/or any additional coordinate-system point starting from the first coordinate-system point and expanding outwardly point-by-point along a radial or spiral path until one of the second, third and/or any additional coordinate-system points does not fall within the range of altitudes.

Alternatively, the searching algorithm, in a more complex form, may select the second, third and/or any additional coordinate-system point starting at a coordinate-system point spaced from the first coordinate-system point such that the second, third and/or any additional coordinate-system point is expected to not fall within the range of altitudes. If the second, third and/or any additional coordinate-system point does not fall within the range of altitudes, then the search algorithm may select the third and/or any additional coordinate-system point at a coordinate-system point spaced from the second coordinate-system point such that the third and/or any additional coordinate-system point is expected to fall within the range of altitudes. If as expected, the search algorithm iterates back and forth until determining a boundary point (or point close thereto) for such iterations.

If, in the example above, the second, third and/or any additional coordinate-system point falls within the range of altitudes when expected to not fall within the range of altitudes, then the search algorithm may select the third and/or any additional coordinate-system point at a coordinate-system point spaced from the second coordinate-system point such that the third and/or any additional coordinate-system point is expected to not fall within the range of altitudes. The search algorithm then starts iterating back and forth from the third or additional coordinate-system point.

Similarly, if the third and/or any additional coordinate-system point does not satisfy the range of altitude when expected to fall within the range of altitudes, then the search algorithm selects one or more additional coordinate-system points at a coordinate-system point spaced from the third (or additional) coordinate-system point such that the additional coordinate-system point is expected to fall within the range of altitudes. The search algorithm then starts iterating back and forth from this additional coordinate-system point.

The foregoing may be reversed such that search algorithm selects the second and third (and additional) coordinate-system points to respectively fall within and not fall within the range of altitudes. Although the foregoing described the search algorithm with respect to determining the boundary in the form of a circle, the search algorithm is equally applicable to forming the boundary in other shapes (e.g., a polygon, ellipse, etc.). For example, the search algorithm may select various coordinate-system points that fall within range of altitude so as to define a plurality of boundary points that together (e.g., by "connecting-the-points") delineate the collection of terrain for the modeled region.

As another alternative, the search algorithm may select the first coordinate-system point and expand outwardly (point-by-point or in steps) along a line segment swept around first coordinate-system point. The line segment may be a constant length so that the boundary is in a form of a circle around the first coordinate-system point. Alternatively, the line segment may be varied in length as being swept about the first coordinate-system point so that the boundary in just about any given shape about the first coordinate-system point.

Additionally, anomalies (such as raised plateaus in flat regions) within the terrain delineated by the boundary that would be otherwise excluded from the region may be included in the modeled regions when a likelihood of the GNSS receiver 102 being located at such anomalies is small. By including these anomalies, the number of modeled regions within the regional-terrain model (if more than one) may be minimized. This may correlate to the regional-terrain model occupying less of the memory 112 and/or the terrain module 108 of the GNSS receiver 102 than if such anomalies were not excluded.

After determining the boundary for the modeled region, the regional-terrain-generation software 222 may form the regional-terrain model by relating (i) the first altitude with (ii) the boundary of the modeled region, as shown in process block 416. For instance, the regional-terrain-generation software 222 may form the regional-terrain model using the examples listed in TABLE 1, by relating the altitudes of Atlanta, Ga.; Cambridge, UK; and Cannes, FR with their respective boundaries, which are defined by their respective (i) latitudes and longitudes combinations, and (ii) radiuses.

TABLE 1

Sample Set Of Regions In A Sample Regional-Terrain Model

| Latitude (deg) | Longitude (deg) | Altitude (m) | Radius (km) | Location |
|---|---|---|---|---|
| 33.766000 | −084.391000 | 200 | 23 | Atlanta, GA, USA |
| 52.200000 | 000.120000 | 64 | 83 | Cambridge, UK |
| 43.551000 | 007.017200 | 50 | 3 | Cannes, FR |

Alternatively, the regional-terrain-generation software 222 may form the regional-terrain model by relating, for each modeled region contained therein, (i) the range of altitudes or any of the aforementioned altitudes, with (ii) the boundary of such the modeled region. After process block 416, the process 400 transitions to process block 418.

At process block 418, the CPU 210 stores the regional-terrain model in the memory 212 for distribution to the GNSS receiver 102. The process 400 terminates at termination block 420. Alternatively, the process 400 may be repeated to add one or more additional modeled regions to the regional-terrain model.

Given that each of the modeled regions may be defined by a boundary rather than a list of each and every coordinate-system point within the boundary, the regional-terrain model may be suited for potentially limited memory capacity and processing capabilities of one or more embodiments of the GNSS receiver 102. Such embodiments of the GNSS receiver 102 typically is or is contained within a battery-powered, handheld mobile station, which, as noted above, may have much less processing power and storage space than, for example, the server 200 or other processing device (not shown) that is capable of processing and storing the DEM 224 or other point-based or grid-based terrain model.

As another alternative, the process 400 may be invoked by the GNSS receiver 102. For example, the GNSS receiver 102, using its position computation software 122, may compute a plurality of three-dimensional positions as it moves from one location to another. The GNSS 102 may then store each of the computed three-dimensional positions in, for example, a data store in the memory 112. After collecting and storing a sufficient number the stored three-dimensional positions (e.g., after computing a number of closely-located three-dimensional positions that define a dense region), the GNSS receiver 102 may define one of the modeled regions as a function of an altitude and/or an altitude uncertainty associated with the stored three-dimensional positions. This altitude may be, for example, a mean altitude of the stored three-dimensional positions, and the altitude uncertainty may be a given deviation from the mean altitude. Thereafter, the GNSS receiver 102 may store this modeled region in the regional-terrain model. Advantageously, when the GNSS receiver 102 subsequently moves into this modeled region, it may invoke process 500 (below) and use this modeled region to compute its position.

As another alternative, the GNSS receiver 102 may send any of the receiver positions and/or altitude information to the server 202. The server 202 may combine the receiver positions and altitude information with other information at (e.g., in the memory 212 of) the server 202 to form one or more of the modeled regions in the regional-terrain model. For example, the server 202 may invoke process 400 and use the receiver positions and altitude information from the GNSS receiver 102 with or without the DEM 224 to form the modeled regions. The server 202 may then supply the GNSS receiver 102 with the modeled regions formed in this way, which allows the GNSS receiver 102 to invoke process 500 (below) and use this modeled region to compute its position.

Figure 5:
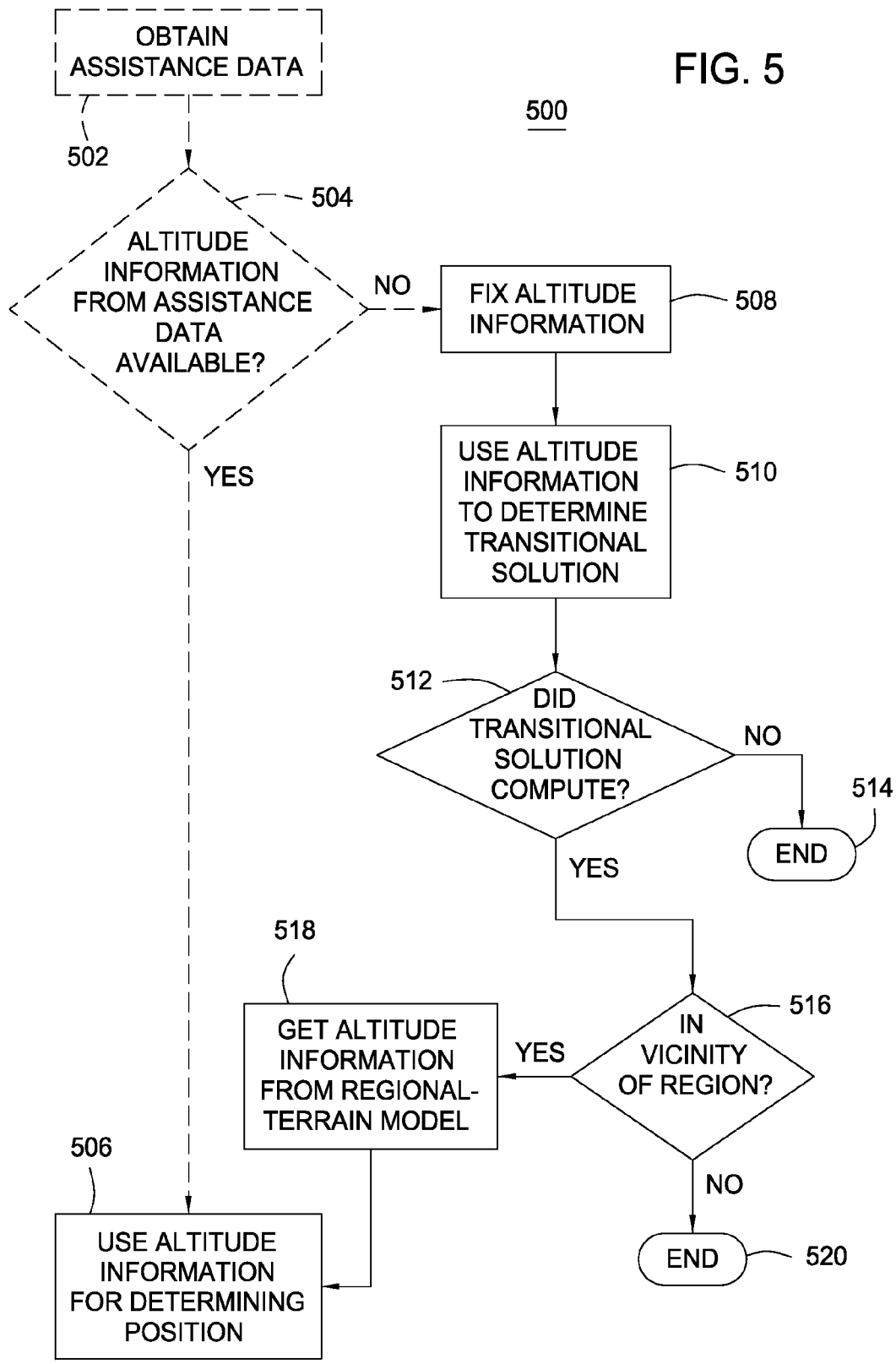
FIG. 5 is a second flow diagram illustrating an example process for computing a position using a regional-terrain model.

FIG. 5 is a flow diagram illustrating an example process 500 for computing a position using a regional-terrain model, such as the regional-terrain model described above. The following describes the process 500 with respect to the GNSS 200 of FIG. 2, for convenience.

The process 500 begins at optional process block 502 at which the GNSS receiver 102 optionally receives the assistance data from the server 200 via its wireless receiver/transceiver 120. At optional decision block 504, the GNSS receiver 102 optionally determines whether the altitude information is available from the assistance data ("assisted-altitude information"). If the assisted-altitude information is available, then the process 500 transitions to process block 506. Alternatively, the optional process blocks 502, 504 may be omitted, and the GNSS receiver 102 may "fix" or otherwise set the assisted-altitude information to pre-defined or default altitude values.

At process block 506, the GNSS receiver 102 optionally uses the assisted-altitude information for determining the position. If, however, the assisted-altitude information is not available, then the process 500 transitions to process block 508. As another alternative, each of the optional process blocks 502 and 504 may be omitted, and the process 500 may transition from termination block 502 to the process block 508.

At process block 508, the GNSS receiver 102 (via computer 104 and positioning module 106) may fix the altitude information to default values. For instance, the GNSS receiver 102 may fix the altitude to a nominal value (e.g., zero meters), and may fix the altitude uncertainty to a large value (e.g., 2000 meters). The GNSS receiver 102 may alternatively fix the altitude to other values, including for example, a last known altitude; and fix the altitude uncertainty to any large value.

After fixing the altitude information, the GNSS receiver 102 uses the altitude information to determine a transitional solution, as shown in process block 510. This assumes that the GNSS receiver 102 can obtain the satellite signals from the three satellites 103a-103c. Without the altitude information, the GNSS receiver 102 might not be able to determine the transitional solution unless the GNSS receiver 102 can obtain satellite signals from at least one other satellite (not shown).

In addition, if the altitude information deviates largely from actual, then such deviation may be manifested in the transitional solution.

At decision block 512, the GNSS receiver 102 determines whether the transitional solution computed (e.g., whether a filter for determining the transitional solution converged). If the transitional solution did not compute, then the process 500 transitions to termination block 514. At termination block 514, the process 500 terminates, and/or waits for more measurements whereupon the process 500 returns to process block 502, 504, 508 and/or 510.

If, on the other hand, the transitional solution computed, then the process 500 transitions to decision block 516. At process decision block 516, the GNSS receiver 102 (via computer 104) determines whether a latitude and longitude obtained from the transitional solution ("obtained lat/lon") is in a vicinity of (e.g., within, closely-located, near or in close proximity to) at least one of the modeled regions defined in the regional-terrain model.

If the obtained lat/long is not in the vicinity any of the modeled regions defined in the regional-terrain model, then the process 500 transitions to termination block 520. At termination block 520, the process 500 terminates, and/or waits for more measurements whereupon the process 500 returns to process block 502, 504, 508, 510 and/or 512.

If, on the other hand, the obtained lat/long is in vicinity of one on the modeled regions, then the process 500 transitions to process block 518. At process block 518, the GNSS receiver 102 (via computer 104) loads from the regional-terrain module 108 the altitude information for such modeled region. Then, at process block 506, the GNSS receiver 102 uses the altitude information to determine the position.

When the obtained lat/long is in the vicinity of two or more of the modeled regions (for example, when such regions have overlapping boundaries), the GNSS receiver 102 at process block 518 may choose to load from the regional-terrain module 108 the altitude information for any one of such modeled regions. The GNSS receiver 102 may choose to load, for example, the altitude information for the one the modeled regions having the smallest altitude uncertainty or for the one of these modeled regions having a center of its boundary that is closer to the obtained lat/long.

Alternatively, the GNSS receiver 102 at process block 518 may choose to load from the regional-terrain module 108 the altitude information for all of the modeled regions in which the obtained lat/long falls within. Accordingly, the GNSS receiver 102 at process block 518 may determine the position (in parallel or sequentially) using the altitude information for each of such modeled regions, and then choose an appropriate one of these modeled regions.

As an option, the GNSS receiver 102 may determine or obtain its speed (i) as part of determining the transitional solution and the position, (ii) via other the assistance data, and/or (iii) via internal speed sensors (e.g., inertial navigation units, accelerometers, etc.). The position receiver 102 may use the receiver speed to prevent or limit use of the regional-terrain model for determining the transitional solution and the position.

Using the regional-terrain model to determine the transitional solution and the position may be counter-productive when the receiver speed is above a given threshold. For example, when GNSS receiver 102 is aboard a traveling aircraft at a very different altitude from the underlying terrain. As such, the GNSS receiver at 102 may not perform process blocks 506-518 when the receiver speed is above a given threshold; for example, above 200 kilometers/hour.

Alternatively or additionally, the GNSS receiver 102 (as opposed to the server 202) may define or add a modeled region ("new modeled region") to the regional-terrain model. To do this, the GNSS receiver 102 may define a boundary for the new modeled region as a function of a recently (e.g., last) determined position and a pre-determined or default altitude uncertainty. For example, the GNSS receiver 102 may define the boundary for the new modeled region by (i) selecting as its single coordinate-system point (e.g., a latitude and longitude) from the recently computed position, and (ii) defining the line segment or radius for the boundary in a nominal fashion (e.g., 1000 meters). This new modeled region may be stored in the memory 112 or in the terrain module 108, and/or transmitted to the server 202 for storage in memory 212.

The new modeled region is beneficial when, for example, the GNSS receiver 102 is powered off (such as when powered off overnight), and later powered on (such as in the morning) without being moved far from its previous position. Unlike simply storing a last known position or portion thereof and using the last known altitude after power-on to determine its position without determining if the GNSS receiver 102 is still at the last known position, the GNSS receiver 102 may use the last known altitude to compute its position only when the last known position is close to the current location of the GNSS receiver. This way, the GNSS receiver 102 may prevent introducing a significant error in the position of GNSS receiver 102 or introducing delays in obtaining from assistance data (if so adapted) assisted-altitude information.

As noted above, the knowledge of the altitude information improves accuracy. In a position for GPS, a standard deviation of horizontal error is characterized by a quantity known as high dilution of precision ("HDOP"). By definition, HDOP multiplied by a standard deviation of measurement errors gives the standard deviation of horizontal error. If an unknown state is removed or a measurement is added (e.g., by use of the altitude information), then HDOP decreases.

The knowledge of altitude information adds to the ability to isolate and remove erroneous satellite measurements in many ways. One of these ways is as follows. After forming a-posteriori residuals, magnitudes and relative values of such residuals may be used to provide information about qualities of satellite measurements. As is well known, a benefit of the a-posteriori residuals increases with the number of degrees of freedom. The number of degrees of freedom is the number of measurements minus the number of unknown states. Thus by using the altitude information, the number of degrees of freedom is increased.

There are many other techniques in which the current invention can be used to identify erroneous satellites. For example, if there are enough satellites, a three-dimensional position can be computed from the satellite measurements. The three-dimensional position may be compared to the regional-terrain model (e.g., to one or more of the modeled regions).

Close agreement between the computed three-dimensional position and the regional-terrain model indicates good accuracy of the computed three-dimensional position. Considerable differences between the computed three-dimensional position and the regional-terrain model, however, may indicate that the computed position is in error.

Similarly, there are many techniques for removing the errors, including iterating over possible combinations of satellite measurements, to produce close agreement with the regional-terrain model. Any similar iterative techniques may be utilized herein.

The positional receiver 102, at times, may compute the position using incorrect data. Using the following process, the accuracy of determining the position may be improved. The following process uses the regional-terrain model to improve quality of the position. This process may be executed within the computer 104 of the aforementioned system.

Figure 6:
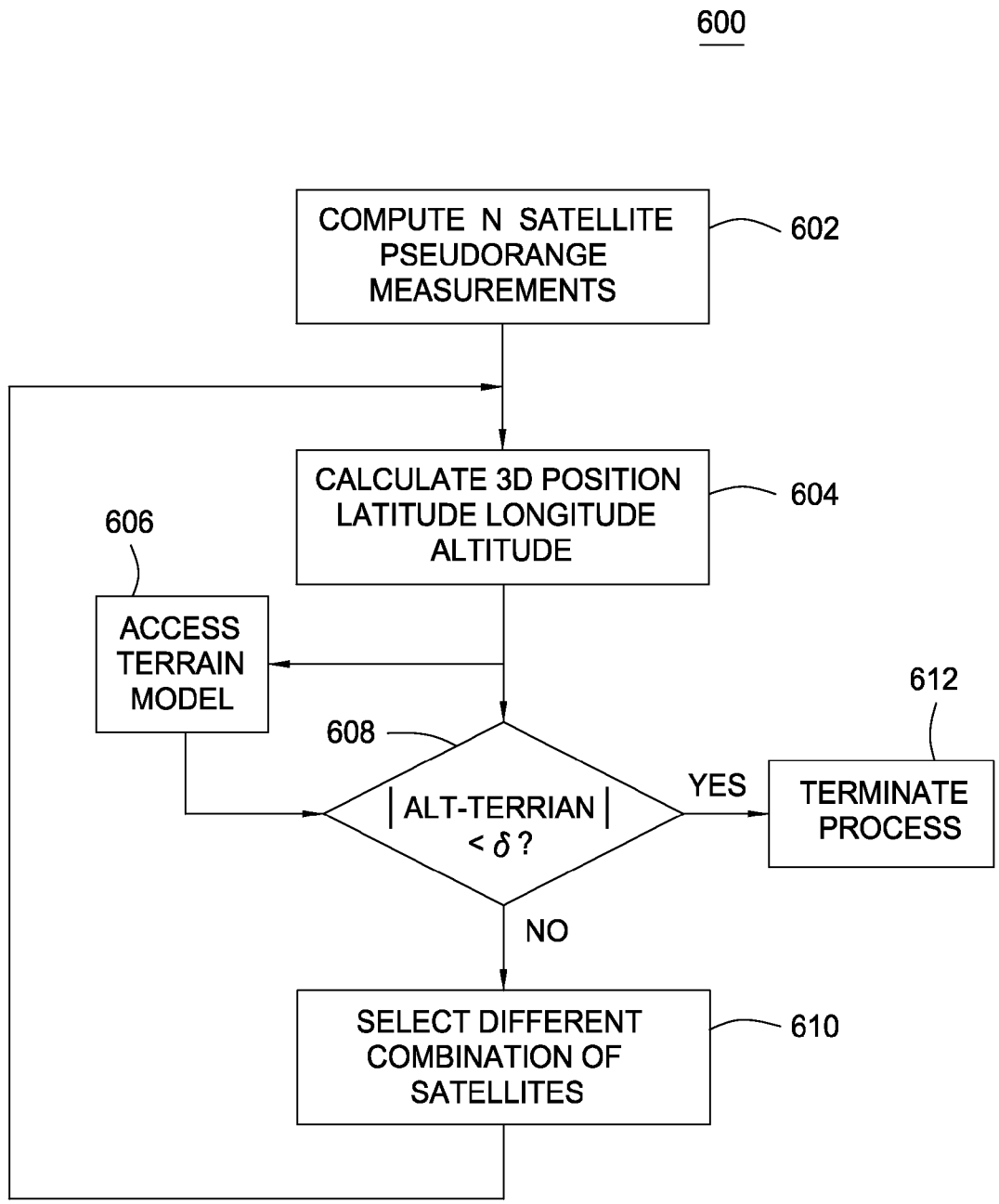
FIG. 6 is a third flow diagram illustrating an example of a process for ensuring quality of a computed position.

FIG. 6 is a flow diagram illustrating an example of a process 600 for improving quality of a position. In process 600, an altitude extracted from the position is compared to an altitude extracted from the regional-terrain model.

The process 600 starts with process block 602 at which the computer 104 obtains N satellite measurements, e.g., pseudoranges. Following process block 602, the process 600 transitions to process block 604. At process block 604, the computer 104 computes a three-dimensional position of the GNSS receiver 102, including latitude, longitude and altitude.

In process 606, the computer 104, using the computed latitude and longitude, may access the regional-terrain model stored in the terrain module 108 to determine its altitude at the latitude and longitude ("modeled altitude"). The process 600 then transitions to decision block 608.

In decision block 608, a computed altitude is compared with the modeled altitude. If a difference between the computed and modeled altitudes is within a prescribed range or threshold (e.g., less than $\delta$), then process 600 transitions to process block 612. At process block 612, the process 600 is terminated because the quality control of the measurements has passed.

If, on the other hand, the difference is not within the prescribed range, then the N measurements and the position derived from them are likely faulty, and the process 600 transitions to process block 610. At process block 610, the computer 104 selects a different combination of satellite signals to compute a new position (typically a subset of N−1 of the original N measurements). The subset of measurement values is used in another iteration of the process 600. The process may iterate until the three-dimensional position agrees with the terrain model or until all combinations of measurements are exhausted. As such, the computer 14 uses the regional-terrain model to remove erroneous measurements from the position. The foregoing method can be used to benefit any error isolation technique by adding altitude information that would otherwise not be available.

After considering the following description, those skilled in the art will clearly realize that the teachings of the invention can be readily utilized in any GNSS System, or alternatively any positioning system ("terrestrial-based" or "satellite-based") utilizing transmitters and receivers.

Although various embodiments which incorporate the teachings of the present invention have been shown and described in detail herein, those skilled in the art can readily devise many other varied embodiments that still incorporate these teachings.

I claim:

1. An apparatus for computing position, comprising:
a receiver operable to obtain pseudorange measurements at a location;
a terrain module operable to contain a regional-terrain model, the regional-terrain model including altitude information associated with a modeled region, wherein the modeled region defines its boundary as a function of a range of altitudes, and wherein the location is within boundary; and
a processor configured to
obtain from the regional-terrain model defined by the boundary as the function of a range of altitudes, the altitude information, and compute a position of the location as a function of the pseudorange measurements and the altitude information.

2. The apparatus of claim 1, wherein the altitude information comprises an altitude and an altitude uncertainty.

3. The apparatus of claim 2, wherein the altitude comprises a first altitude from a given reference point associated with the earth, and the altitude uncertainty comprises a given deviation from the first altitude.

4. The apparatus of claim 1, wherein the boundary is defined by an interconnection of a number of coordinate-system points that together delineate the modeled region.

5. The apparatus of claim 4, wherein the boundary is defined by a point and a line segment.

6. The apparatus of claim 4, wherein the altitude information is used when a speed of the receiver is less than a threshold value.

7. The apparatus of claim 1, wherein the boundary is a function of the range of altitudes of the terrain.

8. A method for computing position, said method comprising:
   obtaining pseudorange measurements at a location at a receiver;
   storing a regional-terrain model, the regional-terrain model including altitude information associated with a modeled region, wherein the modeled region defines its boundary as a function of a range of altitudes, and wherein the location is within boundary at a terrain module; and
   obtaining from the regional-terrain model defined by its boundary as the function of the range of altitudes, the altitude information, and
   computing a position of the location as a function of the pseudorange measurements and the altitude information by a controller.

9. The method of claim 8, wherein the altitude information comprises an altitude and an altitude uncertainty.

10. The method of claim 9, wherein the altitude comprises a first altitude from a given reference point associated with the earth, and the altitude uncertainty comprises a given deviation from the first altitude.

11. The method of claim 8, wherein the boundary is defined by an interconnection of a number of coordinate-system points that together delineate the modeled region.

12. The method of claim 11, wherein the boundary is defined by a point and a line segment.

13. The method of claim 11, wherein the altitude information is used when a speed of the receiver is less than a threshold value.

14. The method of claim 8, wherein the boundary is a function of the range of altitudes of the terrain.

* * * * *